United States Patent [19]

Kropiwnicki

[11] 4,406,592
[45] Sep. 27, 1983

[54] MOTOR-COMPRESSOR UNIT AND A METHOD OF ASSEMBLING MOTOR-COMPRESSOR UNITS

[75] Inventor: Tadek M. Kropiwnicki, Syracuse, N.Y.

[73] Assignee: Carrier Corporation, Syracuse, N.Y.

[21] Appl. No.: 247,659

[22] Filed: Mar. 26, 1981

[51] Int. Cl.³ .................. F04B 17/00; F04B 35/00; F16M 7/00
[52] U.S. Cl. .................. 417/363; 417/902; 248/560; 248/638
[58] Field of Search .................. 417/360, 363, 902; 248/560, 638

[56] References Cited

U.S. PATENT DOCUMENTS

| | | |
|---|---|---|
| 2,039,053 | 4/1936 | Bixler .................. 62/115 |
| 2,102,403 | 12/1937 | Bixler . |
| 2,338,486 | 1/1944 | Bixler . |
| 2,801,045 | 7/1957 | Philipp . |
| 2,894,678 | 7/1959 | Hintze . |
| 2,965,289 | 12/1960 | Weibel . |
| 3,008,629 | 11/1961 | Gerteis .................. 417/415 |
| 3,044,682 | 7/1962 | Weibel . |
| 3,082,939 | 3/1963 | Warner . |
| 3,145,012 | 7/1962 | Kfoury .................. 248/638 |
| 3,169,696 | 2/1965 | Warner . |
| 3,239,132 | 3/1966 | Frank . |
| 3,246,836 | 4/1966 | Ayling . |
| 3,317,121 | 5/1967 | DeGroat . |
| 3,480,205 | 11/1969 | Hatten . |
| 3,486,687 | 12/1969 | Ayling . |
| 3,540,813 | 11/1970 | Murphy .................. 417/363 |
| 3,788,778 | 1/1974 | Miller .................. 417/417 |
| 3,897,177 | 7/1975 | Parker .................. 417/363 |
| 4,063,060 | 12/1977 | Litch .................. 417/360 |
| 4,106,881 | 8/1978 | Stannow .................. 417/363 |
| 4,174,189 | 11/1979 | Elson .................. 417/363 |
| 4,312,627 | 1/1982 | Jacobs .................. 417/902 |

*Primary Examiner*—Richard E. Gluck
*Assistant Examiner*—Jane E. Obee
*Attorney, Agent, or Firm*—Donald F. Daley; Frank N. Decker, Jr.

[57] ABSTRACT

A motor-compressor unit comprising a compressor, a shell enclosing the compressor, and a suspension system resiliently suspending the compressor within the shell. According to a first aspect of the invention, the shell includes first and second sections joined together along a seam defining a vertical plane, and the suspension system includes a mounting plate and a resilient member. The mounting plate is supported by the shell; and the resilient member is supported by and spaced from the shell seam by the mounting plate, and extends between the mounting plate and the compressor to support the compressor resiliently within the shell. According to a second aspect of the invention, the shell and compressor define a plenum; and the suspension system includes a resilient member located in this plenum, extending between the shell and the compressor, and applying a resilient force to the compressor along a cylinder axis thereof to dampen movement of the compressor along the cylinder axis.

2 Claims, 6 Drawing Figures

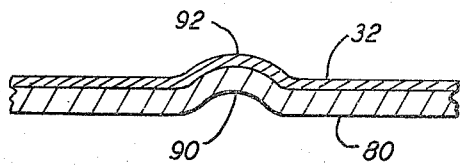
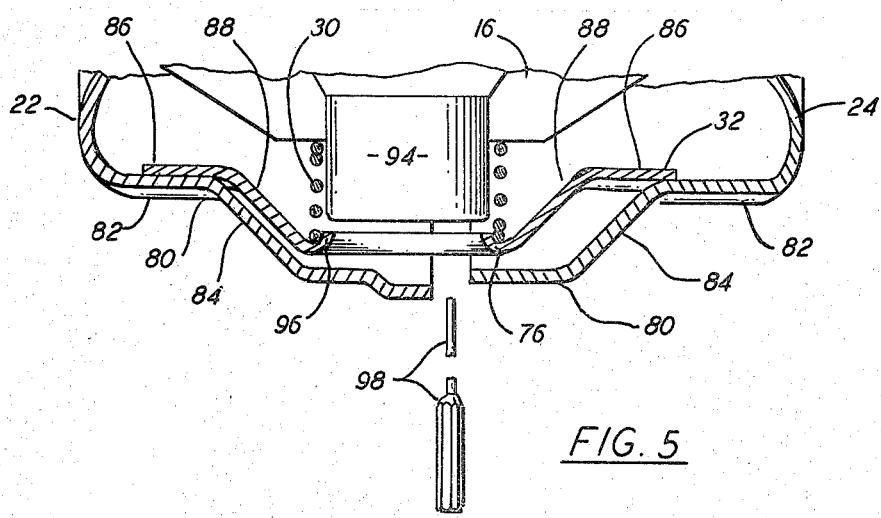
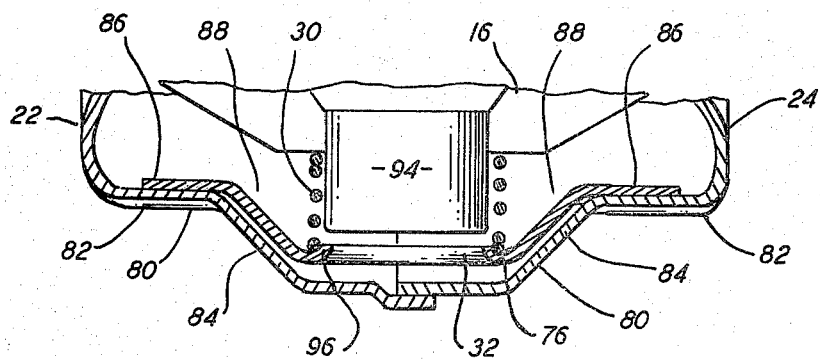

MOTOR-COMPRESSOR UNIT AND A METHOD OF ASSEMBLING MOTOR-COMPRESSOR UNITS

BACKGROUND OF THE INVENTION

This invention generally relates to motor-compressor units and to methods of assembling motor-compressor units. More particularly, the invention relates to suspension systems for motor-compressor units and to methods of locating elements of a suspension system strategically within a shell of a motor-compressor unit.

The utilization of hermetically and semi-hermetically sealed motor-compressor units has become increasingly prevalent in recent years, particularly in refrigeration applications where the motor-compressor unit is employed to compress a refrigerant vapor. Conventionally, the motor-compressor units include a compressor, a motor such as an electric motor for driving the compressor, and a shell enclosing both the compressor and the motor. Usually, the motor and compressor are resiliently mounted or suspended within the shell to minimize or dampen normal vibrations of the compressor and to limit extensive movement of the motor and compressor as might occur during startup of the motor-compressor unit or during shipping or handling.

In addition to achieving these objectives satisfactorily, ideally the suspension or mounting system should meet or satisfy a number of other criteria. For example, of course, the suspension system should not interfere with normal operation of the motor and compressor, and normal operation of the motor-compressor unit should not adversely affect the suspension system to any significant degree. Further, it is preferred to use standard, easily available, and inexpensive parts for the suspension system and to minimize the number of parts or elements of the suspension system to insure reliability as well as to minimize manufacturing, inventory, and assembly costs.

Numerous prior art suspension systems provide excellent results with many typical or common motor-compressor units. Recently, though, considerable attention has been directed toward designing radically new motor-compressor units having, for example, atypically shaped shells and compressors. For example, substantial efforts have been devoted toward constructing the shell and the compressor so that these two elements cooperate together to define and separate suction and discharge plenums.

Moreover, while conventional motor-compressor units employ horizontally split shells—that is, shells having top and bottom halves or sections that are joined together along a seam defining a horizontal plane—much attention has been addressed to designing motor-compressor units with vertically split shells—that is, shells having left and right halves or sections which are joined together along a seam defining a vertical plane—and particularly, with vertically split shells having substantially identical shell sections or halves. While these new motor-compressor units have noteworthy advantages, such as improved thermal insulation of the cool suction vapors from the hot discharge vapors, over prior art units, it is believed that, in order to provide these new motor-compressor units with suspension systems which fully optimize the various and diverse goals and considerations set forth above, revolutionary new suspension systems are needed.

A SUMMARY OF THE INVENTION

In view of the above, an object of this invention is to improve motor-compressor units, particularly suspension systems therefor.

Another object of the present invention is to improve methods of assembling motor-compressor units, and more specifically, methods of locating elements of a suspension system within a shell of a motor-compressor unit.

A further object of this invention is to support a compressor within a shell by means of a centrally located resilient member even though the shell may be formed from vertically split sections welded together along a central seam.

Still another object of the present invention is to apply resilient dampening forces to a compressor along a cylinder axis thereof.

Another object of this invention is to employ advantageously the shape of a shell enclosing a compressor to support and to dampen movement of the compressor within the shell in a very simple and reliable manner using readily available and inexpensive materials.

These and other objectives are attained with a motor-compressor unit comprising a compressor, a motor connected to the compressor in vertical alignment therewith for driving the compressor, a shell enclosing the compressor and the motor, and a suspension system resiliently supporting the compressor within the shell. According to a first aspect of the present invention, the shell includes first and second sections joined together along a seam defining a vertical plane, and the suspension system includes a mounting plate and resilient means. The mounting plate engages and is supported by the shell on both sides of the vertical plane defined by the seam, and has an inner portion spaced from this seam. The resilient means extends on both sides of the vertical plane defined by the shell seam, is supported by and spaced from the seam by the inner portion of the mounting plate, and vertically extends between the mounting plate and the compressor to support the compressor resiliently within the shell. According to a second aspect of the present invention, the shell and compressor define a plenum; and the suspension system includes resilient means located in this plenum, extending between the shell and the compressor, and applying a resilient force to the compressor along a cylinder axis thereof to dampen movement of the compressor along the cylinder axis.

A BRIEF DESCRIPTION OF THE DRAWINGS

Figure 2:
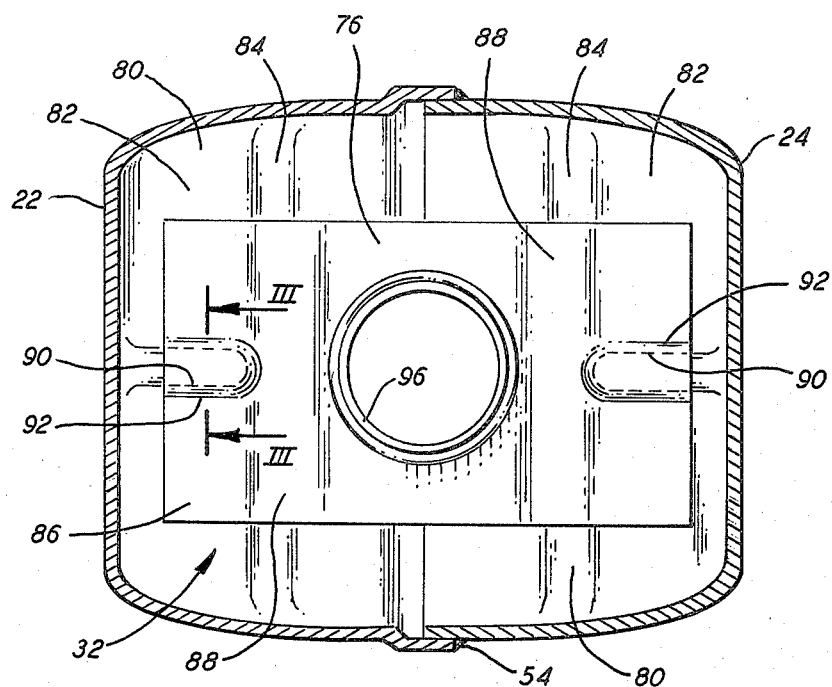
FIG. 2 is a cross sectional view taken along line II—II of FIG. 1 showing the bottom of the shell and the mounting plate of the motor-compressor unit illustrated in FIG. 1 in greater detail.
Figure 4:
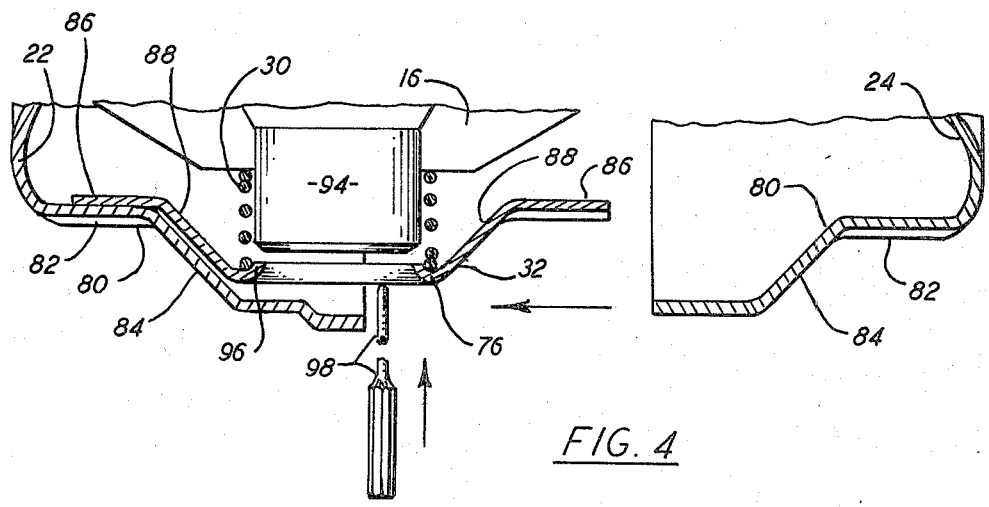

FIG. 3 is a fragmentary, cross sectional view taken along line III—III of FIG. 2 and showing the complementary fit between the mounting plate and the bottom of the shell; and FIGS. 4 through 6 are partial, longitudinal views, partly in cross section illustrating a preferred method of enclosing the mounting plate and the bottom resilient support member of the motor-compressor unit within the shell thereof.

A DETAILED DESCRIPTION OF THE PREFERRED EMBODIMENT

Figure 1:
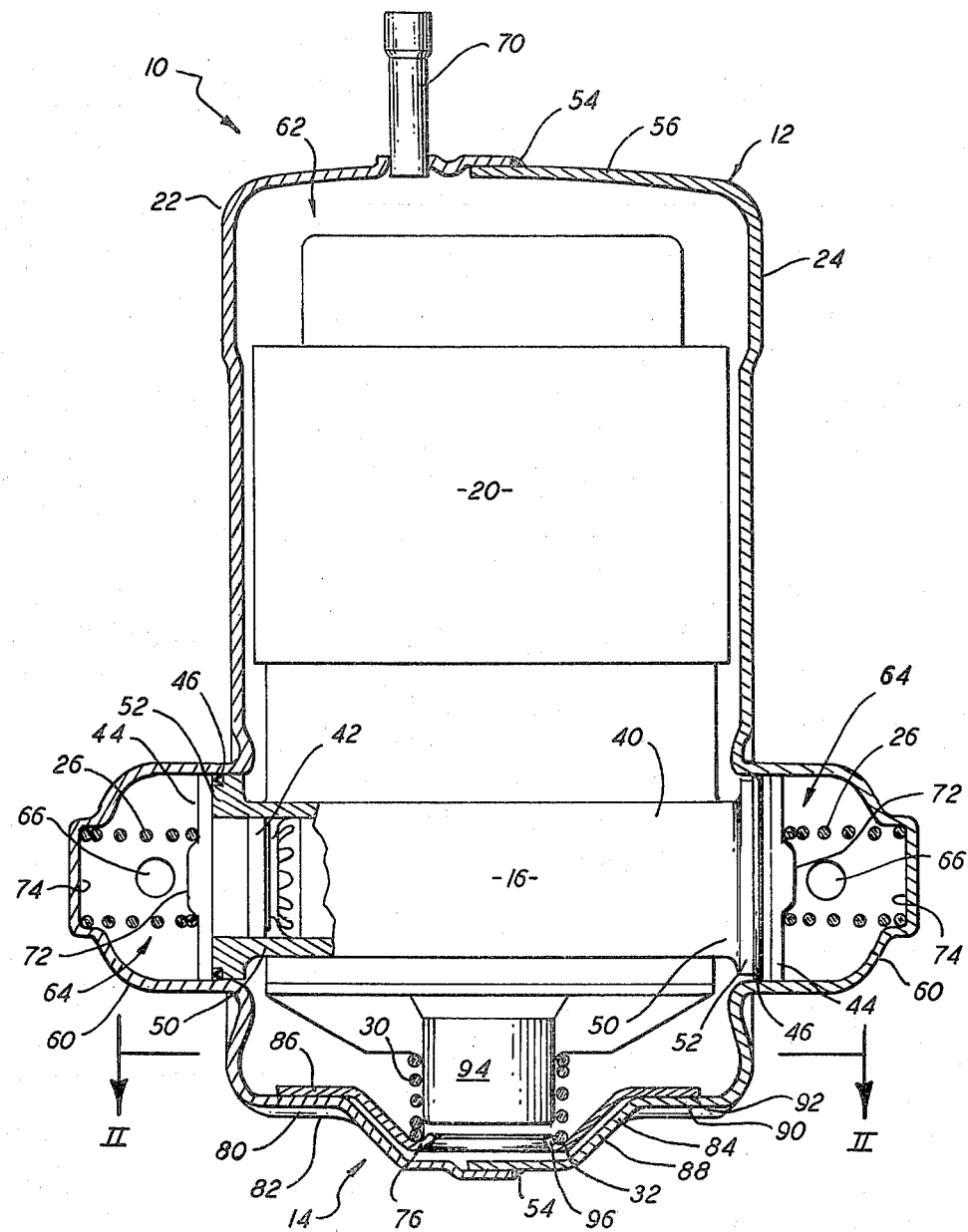
FIG. 1 is a longitudinal view, partially in cross section of a motor-compressor unit illustrating teachings of the present invention.

Particularly referring to FIG. 1, there is disclosed motor-compressor unit 10 illustrating teachings of the present invention. Unit 10 generally includes shell 12, suspension system 14, compressor 16, and motor such as electric motor 20. More specifically, shell 12 includes substantially identical, vertically split, first and second shell halves or sections 22 and 24. Suspension system 14 includes resilient, vibration dampening means 26, resilient, vertical support means 30, and mounting plate 32. Compressor 16 includes cylinder block 40, pistons 42 (only one is shown in the drawings), valve plates 44, and seals such as v-rings 46; and the cylinder block, in turn, includes cylinders 50 and cylinder flanges 52.

In assembly, shell sections 22 and 24 slightly overlap and are joined together, for example by welding, along a seam 54 defining a vertical plane. As so formed, shell 12 includes a relatively large central or head portion 56 within which compressor 16 and motor 20 are generally suspended. Shell 12 also includes a relatively small, generally semi-spherically shaped outside or ear portion 60 projecting outward from head portion 56 adjacent each cylinder 50 of compressor 16. Motor 20 is connected to compressor 16, specifically a rotatable compressor crankshaft (not shown) thereof, for driving the compressor. Also, motor 20 is disposed in vertical alignment with compressor 16, that is, the vertical centerline of the motor rotor is aligned with the compressor crankshaft, and preferably motor 20 is located above and is supported by compressor 16. Pistons 42 are reciprocally disposed within compressor cylinders 50 and the pistons are also connected to the compressor crankshaft, preferably via a scotch-yoke mechanism, wherein rotation of the crankshaft reciprocates the pistons within the compressor cylinders to compress vapor therewithin. A reciprocating counter-weight (not shown) may also be connected to the compressor crankshaft to move opposite movement of pistons 42, tending to balance the pistons as they reciprocate within cylinders 50.

Shell 12 and compressor 16 define a plurality of plenums or chambers within the shell. More particularly, cylinders 50 project into ear portions 60 of shell 12, and cylinder flanges 52 extend outward from the compressor cylinders toward the interior surfaces of the shell. It should be noted, though, that preferably flanges 52 are slightly spaced from the interior surfaces of shell 12 to reduce noise transmission therebetween. For example, a clearance of 0.635 mm (0.025 inches) may be maintained between opposed surfaces of flanges 52 and shell 12. Valve plates 44 are located adjacent to cylinder flanges 52, outward thereof along the axis of cylinders 50, and the valve plates extend substantially parallel to the cylinder flanges. V-rings 46 are captured between flanges 52 and valve plates 44 and have a peripheral surface in contact with the interior surface of shell 12, thus separating the interior of shell 12 into central plenum 62 and outside plenums 64.

In the preferred operation of motor-compressor unit 10, low pressure vapor is conducted into outside plenums 64 via inlet lines 66. As pistons 42 reciprocate within cylinders 50, vapor is drawn into the cylinders through valve plates 44 from plenums 64, compressed within the cylinders, and discharged therefrom through the pistons and into the interior of compressor 16. Therefrom the compressed vapor passes upwardly through central plenum 62, and the vapor is discharged from shell 12 via outlet line 70. As will be understood by those skilled in the art, suction valves (not shown) may be located between valve plates 44 and cylinders 50 to control the flow of low pressure vapor into the cylinders, and discharge valves (also not shown) may be mounted on pistons 42 to control the flow of compressed vapor therethrough.

The above-described operation of motor-compressor unit 10, and particularly the reciprocating movement of pistons 42 within cylinders 50, tends to vibrate compressor 16 and motor 20 within shell 12. Among other things, vibrations of compressor 16 and motor 20 may produce unwanted noise, adversely affect performance of motor-compressor unit 10, and cause undesirable wear on the elements thereof. In accordance with teachings of the present invention, suspension system 14 advantageously employs the atypical shape of shell 12 to dampen vibrations of compressor 16 and motor 20 within the shell in a very simple and inexpensive yet reliable and effective manner.

This dampening effect is achieved via dampening resilient means 26 preferably located in each outside plenum 64. Each resilient means 26 extends between shell 12 and compressor 16, specifically a valve plate 44 thereof, and applies a resilient force to the compressor along the axis of the adjacent cylinder 50 to dampen movement of the compressor therealong. Preferably, each dampening resilient means 26 includes a helical coil spring having an axis aligned with the axis of the adjacent compressor cylinder 50. Moreover, preferably compressor 16, specifically valve plates 44 thereof, defines protrusions 72 receiving first ends of springs 26; and shell 12, specifically ear portions 60, defines recesses 74 aligned with protrusions 72 and receiving second ends of springs 26. With this arrangement, protrusions 72 and recesses 74 facilitate maintaining axial alignment between springs 26 and cylinders 50 during assembly, transportation, and operation of motor-compressor unit 10.

In accordance with additional teachings of this invention, compressor 16 and motor 20 are vertically supported within shell 12 via mounting plate 32 and resilient, vertical support means 30. More specifically, mounting plate 32 engages and is supported by shell 12 on both sides of the vertical plane defined by seam 54, and the mounting plate includes inner portion 76 which is spaced from this seam. At the same time, resilient means 30 extends on both sides of the vertical plane defined by seam 54, is supported by and spaced from the seam by inner portion 76 of mounting plate 32, and vertically extends between the mounting plate and compressor 16 to support the compressor resiliently within shell 12.

By using mounting plate 32 and resilient means 30 as described above, the present invention may be effectively employed to support compressor 16 and motor 20 without requiring, for example, contact between valve plates 44 and shell 12 or that v-rings 46 provide significant support for the compressor and motor. In contrast, valve plates 44 and shell 12 may be maintained spaced apart, inhibiting noise transmission therebetween; and the compressive forces exerted on v-rings 46 may be maintained at relatively low levels, increasing the effectiveness of the v-rings, especially their useful life span. Moreover, because resilient means 30 is spaced from seam 54, the resilient means is protected from the high temperatures commonly generated in the vicinity of the seam as shell sections 22 and 24 are welded together.

With the preferred embodiment of motor-compressor unit 10 illustrated in the drawings, mounting plate 32 is supported by bottom surface 80 of shell 12. Even more particularly, bottom surface 80 of shell 12, generally conforming with the shape of the bottom of cylinder block 40, includes a generally horizontal outward portion 82, and inward portion 84, sloping inwardly and downwardly from outward portion 82. Mounting plate 32 includes outer portion 86, which is disposed above and supported by outward portion 82 of shell surface 80, and intermediate portion 88, which is adjacent to and has a slope approximately matching that of inward portion 84 of shell surface 80. These matching slopes between mounting plate 32 and shell surface 80 help to position, and to maintain the position of, the mounting plate within shell 12. Preferably, though, intermediate portion 88 of mounting plate 32 is slightly spaced from inward portion 84 of the shell bottom surface 80, allowing for some manufacturing variations and assisting the assembly of the mounting plate within shell 12.

Referring now to FIGS. 1, 2 and 3, to further help position and maintain the position of mounting plate 32 within shell 12, the bottom of the shell may be provided with curved, raised beads 90 and mounting plate 32 may be provided with complementary beads 92. In assembly, plate beads 92 closely overlap shell beads 90, and these beads cooperate to allow movement of mounting plate 32 along the longitudinal axes of the beads but inhibit movement of the mounting plate along the transverse axes of the beads.

In addition to the foregoing, the bottom of cylinder block 40 of preferred motor-compressor unit 10 also generally slopes downward and inward and includes a central, downward projection 94, which may house or form a bearing support for the crankshaft of compressor 16. In order to take advantage of this feature of cylinder block 40, preferably resilient means 30 includes a helical coil spring having a first end abutting against a bottom surface of the cylinder block and encircling projection 94 thereof. Also, with this preferred arrangement, inner portion 76 of mounting plate 32 includes annular lip 96 extending inside a second end of coil spring 30, maintaining the spring properly aligned within shell 12.

To assemble motor-compressor unit 10, and specifically to position the various elements of suspension system 14 strategically within shell 12, a first shell section, for example section 22, is located besides and aligned with compressor 16 and motor 20. Resilient means 26 is positioned between recess 74 of this first shell section and the adjacent compressor protrusion 72. Resilient means 30 is mounted on compressor 16, specifically projection 94 of cylinder block 40; and mounting plate 32 is located below the compressor, engaging resilient means 30, and particularly with annular lip 96 projecting inside resilient means 30. Mounting plate 32 is then held, either manually or by a tool 98, in compression against resilient means 30 to maintain outer portion 86 of the mounting plate above bottom surface 80 of the above-mentioned first shell section. With mounting plate 32 so held, the first shell section is moved toward compressor 16 and motor 20 until substantially reaching the assembled position shown in FIG. 1, covering a portion of the compressor and motor and bringing bottom surface 80 of the shell section underneath and into supporting engagement with outer portion 86 of mounting plate 32.

The second shell section, in this example section 24, is located besides and aligned with compressor 16 and motor 20, opposite the first shell section. Resilient means 26 is positioned between recess 74 of the second shell section and the adjacent compressor protrusion 72. With reference to FIG. 4, mounting plate 32 is held, again either manually or by tool 98, in compression against resilient means 30 to maintain outer portion 86 of the mounting plate above bottom surface 80 of the second shell section. With mounting plate 32 so maintained, the second shell section is moved toward compressor 16, motor 20, and the first shell section, sliding bottom surface 80, specifically outward portion 82 thereof underneath and into supporting engagement with outer portion 86 of mounting plate 32, as shown in FIG. 5.

Resilient means 30 and mounting plate 32 are now securely held in place by shell 12, and any tool used to hold the mounting plate in compression against resilient means 30 may be removed. The second shell section is further moved toward and into contact with the first shell section, as shown in FIGS. 1 and 6, and the shell sections 22 and 24 are joined together, enclosing suspension system 14, compressor 16, and motor 20 within shell 12.

Thus, as may be appreciated from a review of the above discussion, suspension system 14 effectively supports and dampens vibrations of compressor 16 and motor 20 within shell 12. System 14 is comparatively easy to install and comprises only a few, simple parts, thus rendering the system very inexpensive. Moreover, suspension system 14 may be, and preferably is, comprised of elements such as helical coil springs 26 and 30 and metallic mounting plate 32 which are very durable and, especially, endure particularly well in a highly charged refrigerant environment, resulting in a reliable, long-lasting suspension system.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A motor-compressor unit comprising:
    a compressor including a cylinder block having a plurality of cylinders defined therein, said cylinders having cylinder flanges extending radially outwardly from the axis of said cylinder block;
    a motor connected to the compressor in vertical alignment therewith;
    a shell enclosing the compressor and the motor having first and second sections joined together along a seam defining a vertical plane, a first ear defined by the first section of said shell and a second ear defined by the second section of said shell, both said first and second ears comprising a cylindrical portion of complimentary shape to said cylinder flanges and extending radially outward of the vertical axis of said shell, said cylinder flanges extending into corresponding ears of said shell sections to form a corresponding plurality of plenums in said shell;
    a mounting plate engaging and being supported by the first and second sections of said shell on both sides of the vertical seam defined by said shell;
    first resilient means disposed between said mounting plate and the bottom of the cylinder block of the compressor, resiliently supporting the compressor within said shell along the axis of said shell, said first resilient means extending on both sides of the vertical plane defined by the seam of said shell;

second resilient means disposed between each of said ears of said shell and the corresponding cylinder flange of the cylinder block disposed therein, exerting force along the axis of said cylinders to absorb lateral movement of the cylinder block within said shell; and the bottom of said first and second shell sections each being provided with a curved raised head, and said mounting plate being provided with complementary beads adjacent the outer portions thereof which closely overlap the beads on the shell sections, said beads cooperating to allow movement of the mounting plate relative to the shell sections along the longitudinal axes of the beads but inhibit movement of the mounting plate along the transverse axes of the beads.

2. A motor-compressor unit as defined in claim 1 wherein said first and second resilient means each comprise helical coil springs exerting force toward said cylinder block.

* * * * *